United States Patent [19]

Shikano et al.

[11] 4,419,455

[45] Dec. 6, 1983

[54] PACKING MATERIALS

[76] Inventors: Hiroshi Shikano, 3-24-6 Hiyoshidai; Tsutomu Harada, 1612-4 Ohaza Kumate, both of Yahata Nishi-ku, Kitakyushu-Shi, Fukuoka-Ken, Japan

[21] Appl. No.: 341,756

[22] Filed: Jan. 22, 1982

[30] Foreign Application Priority Data

Jan. 27, 1981 [JP] Japan ................................ 56/9580

[51] Int. Cl.$^3$ ............................................. C04B 35/80
[52] U.S. Cl. ...................................................... 501/95
[58] Field of Search ........................................ 501/95

[56] References Cited

U.S. PATENT DOCUMENTS 4,201,606 5/1980 Neat ...................................... 501/95

FOREIGN PATENT DOCUMENTS 2445468 4/1976 Fed. Rep. of Germany ........ 501/95
49-44012 4/1974 Japan .................................... 501/95

*Primary Examiner*—James Poer
*Attorney, Agent, or Firm*—Armstrong, Nikaido, Marmelstein & Kubovcik

[57] ABSTRACT

A high erosion resisting-airtight packing material comprising a blend of refractory powder and fiber, low melting point metal and binder.

A high erosion resisting-airtight packing material comprising a blend of refractory powder and fiber, low melting point metal, thermally expandable component and binder.

The refractory powder is metal oxide, metal carbide or metal nitride. The low melting point metal is Al, Mg, Cu or Zn. The binder is sodium hexametaphosphate, sodium tripolyphosphate or sodium pyrrolinephosphate.

12 Claims, No Drawings

PACKING MATERIALS

BACKGROUND OF THE INVENTION

This invention relates to packing materials having properties such as high erosion resisting-airtightness and excellent separation easiness.

The so-called continuous casting has made a striking progress as one of modern teeming processes in steel making in recent years. Cast refractories produced by the continuous casting are generally classified into (a) refractories for ladles which are adapted to hold a batch of molten steel for a long time and then transfer the molten steel into tundish nozzles and (b) refractories for tundish nozzles. As means for controlling the flow rate of molten steel which flows from a ladle into a tundish or from the tundish into a mould, the so-called sliding nozzle system has been increasingly employed in place of the so-called stopper system.

When the sliding nozzle system is employed in conjunction with a ladle, for example, mortar is usually employed at the joint between the nozzle seating block and the upper nozzle, at the joint between the upper nozzle and the upper plate and at the joint between the lower plate and the lower nozzle to connect the respectively adjacent components together. And when the lower nozzle and the long nozzle are connected together, a ceramic fiber sheet has to be employed at the joint between the two nozzles so that the nozzles are easily separated from each other when ladle exchange operation is performed. When the stopper system is employed in connection with a tundish, a ceramic fiber sheet is employed at the joint between the tundish nozzle and the submerged nozzle to connect the two components together. When the sliding nozzle system is employed in connection with the tundish, mortar is employed at the joint between the upper nozzle and the upper plate and at the joint between the lower plate and the middle nozzle to connect the respectively adjacent components together, respectively and a ceramic fiber sheet is usually employed at the joint between the middle nozzle and the submerged nozzle to connect the two components together. When bricks are jointed together so that the brick assembly functions as one system, the packing material placed between the bricks performs a very important role.

Mortar has the inherent disadvantages that mortaring requires skilled hand, that the mortar cannot be removed from the joints of bricks without doing damage to the joints of bricks and the mortar has insufficient airtightness. Although ceramic fiber also has the inherent disadvantages that the ceramic fiber is easily attacked by molten steel, that the ceramic fiber has insufficient airtightness and that the ceramic fiber imperatively necessitates brick exchange in a brief time, the ceramic fiber is widely employed because the material can be easily and rapidly separated from the joints between bricks.

SUMMARY OF THE INVENTION

The present invention has been developed to eliminate the disadvantages inherent in the use of the conventional packing materials for bricks such as mortar and ceramic fiber sheets as referred to hereinabove. For the purpose, according to one aspect of the present invention, there has been provided a high erosion resisting-airtight packing material which essentially comprises a blend consisting of at least one refractory powder and fiber, 0.5–20 parts by weight of a granular low melting point metal having sizes up to 3.0 mm and preferably, up to 0.1 mm based on 100 parts by weight of the blend and a binder in an amount varying depending upon the amount of the granular low melting point metal. According to another aspect of the present invention, the above-mentioned blend further has 0.01–5 parts by weight of a component which expands when heated based on 100 parts by weight of the blend.

In the packing material according to the present invention, when the blend is added thereto a low melting point metal such as granular Al in an amount within the range of 0.5–20 parts by weight based on 100 parts by weight of the blend, for example, Al fuses in an elevated temperature environment in which the refractory structure using the packing material is placed in a steel making operation and the fused low melting point metal reacts with the oxygen contained in the air which permeates into the packing material to produce $Al_2O_3$. When the low melting point metal reacts with the oxygen to produce $Al_2O_3$, the metal increases its volume to fill up pores present in the packing material to densify the structure of the packing material resulting in a highly airtight packing material. As the low melting metal for use in the packing material of the present invention, although the use of Mg, Cu or Zn in place of Al may be conceived by those skilled in the art, since the alternative low melting point metals present problems that the metals should be employed in a substantial amount, that they are difficult in handling, that they adversely affect the rigidity of the obtained packing material and that they do not give sufficient erosion resisting property to the resulting packing material when the metals oxidize, Al is most suitably employed in the packing material of the invention as the low melting point metal component. If the low melting point metal such as Al is employed in an amount less than 0.5 parts by weight based on 100 parts by weight of the blend, the resulting packing material will not have sufficiently high erosion resisting-airtight properties. On the other hand, when Al is employed in an amount greater than 20 parts by weight based on 100 parts by weight of the blend, a liquid is produced in such a substantial amount that the resulting packing material cannot maintain its integrality.

When Al is added to the blend in an amount within the range of 0.5–20 parts by weight based on 100 parts by weight of the blend, although the resulting packing material has sufficiently high erosion resisting-airtight properties, if organic component which expands under heating as usually employed in the preparation of foam styrene, foam polyethylene and urethane, acid-treated graphite and inorganic component such as vermiculite are added to the blend in an amount within the range of 0.01–5 parts by weight based on 100 parts by weight of the blend, the pores present in the packing material can be further filled up to give a further improved airtightness to the packing material. For example, the acid-treated graphite increases its volume by about 60 times the initial volume when heated suddenly to a high temperature. When any one of the additives is employed in an amount less than 0.01 parts by weight based on 100 parts by weight of the principal blend, the high erosion resisting-airtight properties of the resulting packing material will be appreciably improved. And when the additive is employed in an amount greater than 5 parts by weight based on 100 parts by weight of the principal blend, the resulting packing material cannot maintain its integrality.

The refractory powder to be employed as one component of the principal blend in the packing material of the present invention is at least one member selected from the group consisting of metal oxides such as alumina, magnesia, silica, zirconia, alumina-silica, zirconia-silica, magnesia-alumina, magnesia-chrome, magnesia-magnesite chrome and magnesia-calcia; metal carbide such as silicon carbide; metal nitride such as silicon nitride; and carbon.

As alumina-silica, the refractory such as kyanite is preferably employed because the refractory expands at an elevated temperature and further improves the air-tightness of the packing material. Furthermore, although clay and bentonite are suitable refractories to be employed in the blend with respect to the maintenance of integrity of the resulting packing material, such refractories are usually employed in a great amount resulting in the emission of smoke in the preparation of the packing material. Thus, such refractories should be employed in a small amount or the use of these factories may be eliminated.

The fiber to be employed as the other component of the principal blend is inorganic to organic matter or metal. The fiber is preferably employed in an amount within the range of 3-10 parts by weight through any increase in the amount of the fiber improves the malleability and tensile strength of the resulting packing material correspondingly.

The binder useful in the packing material of the invention may be inorganic or organic matter. Inorganic matters useful in the packing material of the invention include sodium hexamethaphosphate, sodium tripoliphosphate and sodium pyrrolinephosphate and organic matters useful in the packing material include phenol resin, furan resin, epoxy resin and silicone resin. However, in order to prevent Al in the principal blend from transforming into Al(OH)$_3$ while Al is being kneaded together with the refractory powder or the blend is being stored, condensed sodium phosphate is preferably used as the inorganic matter whereas phenol resin is preferably used as the organic resin because the preferable organic matter has a relatively high rate of carbon residue and is less expensive. The binder can be diluted by a suitable diluent so as to adjust its viscosity as desired. When it is an important consideration to eliminate the problem relating to smoke emission in the preparation of the packing material, silicone resin is preferably employed.

The packing material of the invention can be employed in the same manner as that in which conventional mortar is employed. Alternatively, the packing material can be also employed in the same manner as that in which preformed seramic fiber sheets are employed. The separation property of the packing material at the time of brick exchange becomes one important property called for the material depending upon the location where the packing material is used. When brick exchange is made, at the joint between the long nozzle and the lower nozzle the packing material should remain to adhere to the contacting face of the long nozzle and at the joint between the submerged nozzle and the middle nozzle the packing material should remain to adhere to the contacting face of the submerged nozzle, respectively, so that brick exchange can be performed without difficulty. In order to accelerate brick exchange, it is recommended that a suitable surface lubricant is applied to the boss of the long nozzle or middle nozzle. Alternatively, water soluble or oil surface lubricant such as graphite, molybdenum disulfide or boron nitride is applied to one surface of the molded packing material.

For better understanding of the present invention, the following examples are given. However, it is to be noted that these examples illustrate the invention, but do not limit the scope of the invention thereto in any way.

EXAMPLE 1

65 parts by weight of powdery alumina having sizes up to 325 mesh, 20 parts by weight of powdery clay having sizes up to 0.2 mm, 5 parts by weight of powdery bentonite having sizes up to 0.2 mm, 10 parts by weight of powdery Al having sizes up to 0.2 mm, 6 parts by weight of ceramic fiber, 1 part by weight of carbon powder and 30 parts by weight of phenol resin/ethylene glycol (1/4) were fully kneaded together in a mixer and the obtained product was stretched to a sheet having a predetermined thickness for test.

EXAMPLE 2

65 parts by weight of powdery alumina having sizes up to 325 mesh, 20 parts by weight of powdery clay having sizes up to 0.2 mm, 5 parts by weight of powdery bentonite having sizes up to 0.2 mm, 10 parts by weight of powdery Al having sizes up to 0.2 mm, 3 parts by weight of ceramic fiber, 1 part by weight of carbon powder, 0.2 parts by weight of powdery acid-treated graphite having sizes up to 1 mm and 31 parts by weight of phenol resin/ethylene glycol (4/1) were fully kneaded together in a mixer and the obtained product was stretched to a sheet having a predetermined thickness for test.

EXAMPLE 3

One surface of the sheet obtained in Example 1 was applied a water soluble graphite surface lubricant thereto.

EXAMPLE 4

One surface of the sheet obtained in Example 2 was applied a water soluble graphite surface lubricant thereto.

EXAMPLE 5

30 parts by weight of powdery alumina having sizes up to 1 mm, 60 parts by weight of powdery alumina having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were fully kneaded together in a mixer and the obtained product was stretched to a sheet having a predetermined thickness for test.

EXAMPLE 6

30 parts by weight of magnesia having sizes up to 1 mm, 60 parts by weight of magnesia clinker having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were fully kneaded together in a mixer and the obtained product was stretched to a sheet having a predetermined thickness for test.

EXAMPLE 7

30 parts by weight of powdery spinel having sizes up to 1 mm, 60 parts by weight of powdery spinel having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were fully kneaded together and the obtained product was stretched to a sheet having a predetermined thickness for test.

EXAMPLE 8

30 parts by weight of powdery chrome ore having sizes up to 1 mm, 60 parts by weight of powdery chrome ore having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were fully kneaded together and the obtained product was stretched to a sheet having a predetermined thickness for test.

EXAMPLE 9

30 parts by weight of artificial powdery magnesite-chrome material having sizes up to 1 mm, 60 parts by weight of artificial powdery magnesite-chrome material having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were fully kneaded together in a mixer and the obtained product was stretched to a sheet having a predetermined thickness for test.

EXAMPLE 10

30 parts by weight of zircon sand, 60 parts by weight of zircon powder, 10 parts by weight of powdery Al having sizes up to 0.2 mm, 6 parts by weight of ceramic fiber, 1 part by weight of carbon powder and 22 parts by weight of phenol resin/ethylene glycol (4/1) were kneaded together in a mixer and the obtained product was stretched to a sheet having a predetermined thickness for test.

EXAMPLE 11

30 parts by weight of powdery zirconia having sizes up to 1 mm, 60 parts by weight of powdery zirconia having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were mixed together in a mixer and the obtained product was stretched to a sheet having a predetermined thickness for test.

EXAMPLE 12

30 parts by weight of powder silica having sizes up to 1 mm, 60 parts by weight of powdery silica having sizes up to 325 mesh, 6 parts by weight of powdery Al having sizes up to 0.2 mm, 6 parts by weight of ceramic fiber, 1 part by weight of carbon powder and 22 parts by weight of phenol resin/ethylene glycol (4/1) were kneaded together in a mixer and the obtained product was stretched to a sheet having a predetermined thickness for test.

EXAMPLE 13

30% by weight of powdery alumina having sizes up to 1 mm, 60% by weight of magnesia clinker having sizes up to 325 mesh, 10% by weight of powdery Al having sizes 0.2 mm, 6 parts by weight of ceramic fiber, 1 part by weight of carbon powder and 22 parts by weight of phenol resin/ethylene glycol (4/1) were kneaded together in a mixer and the obtained product was stretched to a sheet having a predetermined thickness for test.

EXAMPLE 14

30 parts by weight of powdery chrome ore having sizes up to 1 mm, 60 parts by weight of powdery magnesia having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were kneaded together in a mixer and the obtained product was stretched to a sheet having a predetermined thickness for test.

EXAMPLE 15

30 parts by weight of artificial powdery magnesite chrome material having sizes up to 1 mm, 60 parts by weight of magnesia having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol were kneaded together in a mixer and the obtained product was stretched to a sheet having a predetermined thickness for test.

EXAMPLE 16

30 parts by weight of artificial powdery dolomite material having sizes up to 1 mm, 60 parts by weight of powdery magnesia having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were kneaded together in a mixer and the obtained product was stretched to a sheet having a predetermined thickness for test.

EXAMPLE 17

30 parts by weight of zircon sand, 60 parts by weight of powdery zirconia having sizes up to 325 mesh, 10 parts by weight of powdery Al having sizes up to 0.2 mm, 6 parts by weight of ceramic fiber, 1 part by weight of carbon powder and phenol resin/diethylene glycol (4/1) were kneaded together in a mixer and the obtained product was stretched to a sheet having a predetermined thickness for test.

EXAMPLE 18

30 parts by weight of powdery silicon carbide having sizes up to 1 mm, 60 parts by weight of powdery silicone carbide having sizes up to 325 mesh, 10 parts by weight of powdery Al having sizes up to 0.2 mm, 10 parts by weight of ceramic fiber, 1 part by weight of carbon powder and 22 parts by weight of phenol resin/ethylene glycol (4/1) were kneaded together in a mixer and the obtained product was stretched to a sheet having a predetermined thickness for test.

EXAMPLE 19

30 parts by weight of powdery silicon nitride having sizes up to 1 mm, 60 parts by weight of powdery silicone nitride having sizes up to 325 mesh, 10 parts by weight of powdery Al having sizes up to 0.2 mm, 6 parts by weight of ceramic fiber, 1 part by weight of carbon powder and 22 parts by weight of phenol resin/ethylene glycol (4/1) were fully kneaded together in a mixer and the obtained product was stretched to a sheet having a predetermined thickness for test.

EXAMPLE 20

55 parts by weight of powdery alumina having sizes up to 325 mesh, 20 parts by weight of powdery clay having sizes up to 0.2 mm, 5 parts by weight of powdery bentonite having sizes up to 0.2 mm, 10 parts by weight of kyanite having sizes up to 0.2 mm, 10 parts by weight of powdery Al having sizes up to 0.2 mm, 6 parts by weight of ceramic fiber, 1 part by weight of carbon powder and 32 parts by weight of phenol resin/ethylene glycol (4/1) were kneaded together in a mixer and the obtained product was stretched to a sheet having a predetermined thickness for test.

EXAMPLE 21

30 parts by weight of powdery alumina having sizes up to 1 mm, 50 parts by weight of powdery alumina having sizes up to 325 mesh, 10 parts by weight of kyanite having sizes up to 0.2 mm, 10 parts by weight of powdery Al having sizes up to 0.2 mm, 6 parts by weight of ceramic fiber, 1 part by weight of carbon powder and 21 parts by weight of phenol resin/diethylene glycol (9/1) were kneaded together in a mixer and the obtained product was stretched to a sheet having a predetermined thickness for test.

EXAMPLE 22

One surface of the product obtained in Example 1 was applied a water soluble graphite surface lubricant thereto.

EXAMPLE 23

One surface of the product obtained in Example 2 was applied a water soluble graphite surface lubricant thereto.

EXAMPLE 24

30 parts by weight of powdery alumina having sizes up to 1 mm, 50 parts by weight of powdery alumina having sizes up to 325 mesh, 10 parts by weight of kyanite having sizes up to 0.2 mm, 10 parts by weight of powdery Al having sizes up to 0.2 mm, 6 parts by weight of ceramic fiber, 1 part by weight of carbon fiber and 15 parts by weight of silicone resin were kneaded together in a mixer and the obtained product was stretched to a predetermined thickness followed by the application of a water soluble graphite surface lubricant to one surface of the product.

CONTROL 1

Conventional mortar

CONTROL 2

Conventional ceramic fiber sheets.

The packing materials of the invention as described in connection with Examples 1 through 24 and Controls 1 and 2 were tested for their quality and the results of the tests are shown in the below-given Table 1. In order to determine the hot volume stability of the packing materials of the invention and of the controls, a smaple brick piece having the diameter of 30 mm and the thickness of 30 mm was cut off an alumina-graphite brick lining system and the sample brick piece was cut in the center thereof into two half portions. Each of the above-mentioned packing materials was sandwiched in the thickness of 3 mm between the two half brick portions and the brick portions were applied thereto a load of 3.5 kg/cm$^2$ on the sides of the brick portions remote from the packing material in an N$_2$ atmosphere for measuring the softening-under-load of the packing material. The measurement of softening was obtained by measuring variation in the size of the sandwich structure in a linear plane extending through the two half brick portions and the interposed packing material.

The separation ability of the packing material was determined by the easiness with which the packing material in the thickness of 4 mm was separated from the two brick half portions after the above-mentioned softening-underload test.

The porosity of the packing material was determined by preparing a sample packing material having the diameter of 50 mm and the thickness of 30 mm and heating the sample first at 100° C. for 24 hours and then at 1400° C. for two hours in an oxidizing environment in each case.

The erosion resisting to steel was determined by cutting a brick sample off the brick lining system for rotary erosion test, cutting the sample brick into two half portions, sandwiching a packing material sample between the two brick half portions and placing the sandwich structure into a molten pig iron bath received in a rotary erosion tester and measuring the erosion depth of the molten pig iron into the packing material sample.

TABLE 1

| Softening-under-load | Example 1 | Example 2 | Example 3 | Example 4 | Example 5 | Example 6 | Example 7 |
| --- | --- | --- | --- | --- | --- | --- | --- |
| Load of 3.5 kg/cm$^2$ Contraction rate (%) | | | | | | | |
| at 200° C. | 0 | −1.0 | 0 | −0.9 | −0.7 | −0.4 | −0.5 |
| at 400° C. | −0.2 | +1.2 | −0.2 | −1.1 | −0.8 | −0.4 | −0.5 |
| at 600° C. | 0 | −1.2 | 0.1 | −1.2 | −1.1 | −0.5 | −0.7 |
| at 800° C. | 0 | −1.2 | 0 | −1.1 | −0.9 | −0.2 | −0.4 |
| at 1000° C. | 0 | −1.0 | 0 | −1.1 | −0.9 | −0.3 | −0.5 |
| at 1200° C. | −0.6 | −1.4 | −0.7 | −1.5 | −1.1 | +0.1 | −0.6 |
| at 1400° C. | −0.8 | −1.8 | −0.7 | −1.7 | −0.9 | +0.2 | −0.3 |
| at 1600° C. | −2.2 | −2.0 | −2.0 | −2.0 | −0.9 | +0.3 | −0.3 |
| Separation property | rather good | rather good | good | good | rather good | rather good | rather good |
| Porosity (cm$^3$/cm$^2$.H$_2$O.S) | | | | | | | |
| 100° C. × 24 hrs | 0.003 | 0.002 | 0.002 | 0.002 | 0.0003 | 0.0002 | 0.0002 |

TABLE 1-continued

| | | | | | | | |
|---|---|---|---|---|---|---|---|
| 1400° C. × 2 hrs | 0.006 | 0.005 | 0.006 | 0.005 | 0.0092 | 0.0014 | 0.0023 |
| Rotary erosion test Depth of pig iron erosion (mm) | 12 | 10 | 11 | 10 | 10 | 6 | 9 |

| Softening-under-load | Example 8 | Example 9 | Example 10 | Example 11 | Example 12 | Example 13 | Example 14 |
|---|---|---|---|---|---|---|---|
| Load of 3.5 kg/cm² Contraction rate (%) | | | | | | | |
| at 200° C. | −0.6 | −0.5 | −0.6 | −0.5 | −0.7 | −0.5 | −0.5 |
| at 400° C. | −0.7 | −0.6 | −0.7 | −0.5 | −0.8 | −0.5 | −0.6 |
| at 600° C. | −0.8 | −.07 | −0.9 | −0.4 | −0.5 | −0.7 | −0.6 |
| at 800° C. | −0.8 | −0.7 | −0.8 | −0.6 | −0.5 | −0.5 | −0.6 |
| at 1000° C. | −0.9 | −0.6 | −0.8 | −0.5 | −0.4 | −0.6 | −0.7 |
| at 1200° C. | −0.9 | −0.6 | −1.0 | −0.4 | −0.4 | −0.5 | −0.6 |
| at 1400° C. | −1.0 | −0.7 | −1.1 | −0.3 | −0.3 | −0.3 | −0.5 |
| at 1600° C. | −0.9 | −0.4 | −1.0 | −0.4 | −0.3 | −0.3 | −0.4 |
| Separation property | rather good | rather good | rather good | rather good | rather good | rather good | rather good |
| Porosity (cm³/cm²·H₂O·S) | | | | | | | |
| 100° C. × 24 hrs | 0.0001 | 0.0002 | 0.0003 | 0.0003 | 0.0002 | 0.0002 | 0.0002 |
| 1400° C. × 2 hrs | 0.0021 | 0.0018 | 0.0030 | 0.0035 | 0.0015 | 0.0041 | 0.0026 |
| Rotary erosion test Depth of pig iron erosion (mm) | 7 | 6 | 12 | 7 | 12 | 7 | 7 |

| Softening-under-load | Example 15 | Example 16 | Example 17 | Example 18 | Example 19 | Example 20 | Example 21 |
|---|---|---|---|---|---|---|---|
| Load of 3.5 kg/cm² Contraction rate (%) | | | | | | | |
| at 200° C. | −0.4 | −0.6 | −0.5 | −0.7 | −0.8 | −0.5 | −0.4 |
| at 400° C. | −0.4 | −0.5 | −0.6 | −0.8 | −0.7 | −0.6 | −0.3 |
| at 600° C. | −0.5 | −0.6 | −0.5 | −0.9 | −0.9 | −0.6 | −0.3 |
| at 800° C. | −0.4 | −0.5 | −0.6 | −1.0 | −0.9 | −0.5 | −0.4 |
| at 1000° C. | −0.4 | −0.7 | −0.5 | −1.0 | −1.0 | −0.8 | −0.7 |
| at 1200° C. | −0.3 | −0.6 | −0.5 | −1.0 | −1.1 | −1.1 | −0.8 |
| at 1400° C. | −0.3 | −0.5 | −0.4 | −0.9 | −1.0 | −0.4 | −0.1 |
| at 1600° C. | −0.1 | −0.4 | −0.4 | −0.9 | −0.9 | +1.0 | +1.3 |
| Separation property | rather good | rather good | rather good | rather good | rather good | rather good | rather good |
| Porosity (cm³/cm²·H₂O·S) | | | | | | | |
| 100° C. × 24 hrs | 0.0002 | 0.0002 | 0.0003 | 0.0001 | 0.0001 | 0.0001 | 0.0003 |
| 1400° C. × 2 hrs | 0.0016 | 0.0031 | 0.0033 | 0.0073 | 0.0068 | 0.0011 | 0.0092 |
| Rotary erosion test Depth of pig iron erosion (mm) | 6 | 7 | 10 | 11 | 11 | 11 | 10 |

| Softening-under-load | Example 22 | Example 23 | Example 24 | Control 1 | Control 2 |
|---|---|---|---|---|---|
| Load of 3.5 kg/cm² Contraction rate (%) | | | | | |
| at 200° C. | −0.4 | −0.4 | −0.6 | −0.8 | −0.8 |
| at 400° C. | −0.6 | −0.3 | −0.5 | −1.0 | −0.8 |
| at 600° C. | −0.5 | −0.4 | −0.6 | −1.0 | −0.8 |
| at 800° C. | −0.5 | −0.3 | −0.5 | −1.0 | −0.8 |
| at 1000° C. | −0.9 | −0.7 | −0.7 | −1.0 | −1.8 |
| at 1200° C. | −1.0 | −0.7 | −0.9 | −2.5 | −2.6 |
| at 1400° C. | −0.3 | −0.1 | −0.5 | −3.0 | −3.8 |
| at 1600° C. | +1.1 | +1.3 | +0.9 | −3.5 | −4.6 |
| Separation property | good | good | good | bad | good |
| Porosity (cm³/cm²·H₂O·S) | | | | | |
| 100° C. × 24 hrs | 0.0001 | 0.0002 | 0.0001 | 0.029 | 0.30 |
| 1400° C. × 2 hrs | 0.0009 | 0.0087 | 0.0012 | 0.077 | 0.30 |
| Rotary erosion test Depth of pig iron erosion (mm) | 11 | 10 | 10 | 15 | 20 |

As clear from the above-given Table 1, Examples 1 through 4 are superior to Controls 1 and 2 with respect to hot volume stability and exhibit excellent erosion resisting to molten pig iron and low porosities. Examples 3 and 4 show excellent separation ability. When the packing materials of the present invention were employed at the joints between the middle nozzles and the submerged nozzles in the tundishes at maximum eight charges for about seven consecutive hours, excellent results which were not seen by the use of conventional mortar and ceramic fiber sheets were obtained with no air trapped in the packing materials. And when a surface lubricant was applied to the boss of the middle nozzle, the surface lubricant remained to adhere to the submerged nozzle at the time of brick exchange to thereby eliminate the above-mentioned problems in connection with separation at brick exchange which would otherwise occur.

Furthermore, the application of the packing materials of the present invention is not limited to that as described hereinabove, but the packing materials can be also employed as general fillers and tundish coatings.

What is claimed is:

1. A high erosion resisting-airtight packing material which consists essentially of:
   a blend consisting of 0.5-20 parts by weight of a low melting point metal based on 100 parts by weight of said blend, 3-10 parts by weight of fiber and the balance of at least one refractory powder, and
   a binder in an amount varying depending upon the amount of said low melting point metal.

2. A high erosion resisting-airtight packing material which consists essentially of:
   a blend consisting of 0.5-20 parts by weight of a low melting point metal based on 100 parts by weight of said blend, 3-10 parts by weight of fiber, 0.01-5 parts by weight of a component other than said low melting point metal which expands under heating based on 100 parts by weight of said blend and the balance of at least one refractory powder, and
   a binder in an amount varying depending upon the amounts of said low melting point metal and component.

3. The high erosion resisting-airtight packing material as set forth in claim 1 or 2, in which said refractory powder comprises one or more members selected from the group consisting of metal oxides, metal carbide, metal nitride and carbon.

4. The high erosion resisting-airtight packing material as set forth in claim 3, in which said metal oxides are alumina, magnesia, silica, zirconia, alumina-silica, zirconia-silica, magnesia-alumina, magnesia-chrome, magnesia-magnesite chrome and magnesia-calcia, said metal carbide is silicon carbide and said metal nitride is silicon nitride.

5. The high erosion resisting-airtight packing material as set forth in claim 1 or 2, in which said fiber is an inorganic matter.

6. The high erosion resisting-airtight packing material as set forth in claim 1 or 2, in which said fiber is an organic matter.

7. The high erosion resisting-airtight packing material as set forth in claim 1 or 2, in which said fiber is metal.

8. The high erosion resisting-airtight packing material as set forth in claim 1 or 2, in which said binder is an inorganic matter.

9. The high erosion resisting-airtight packing material as set forth in claim 1 or 2, in which said binder is an organic matter.

10. The high erosion resisting-airtight packing material as set forth in claim 8, in which said inorganic matter is a member selected from the group consisting of sodium hexametaphosphate, sodium tripolphosphate and sodium pyrophosphate.

11. The high erosion resisting-airtight packing material as set forth in claim 1 or 2, wherein said packing material has a coating of a water soluble or oil surface lubricant on one surface thereof.

12. The erosion resisting-airtight packing material as set forth in claim 11, wherein said water soluble or oil surface lubricant is selected from the group consisting of graphite, molybdenum disulfide and boron nitride.

* * * * *